Figure 1:
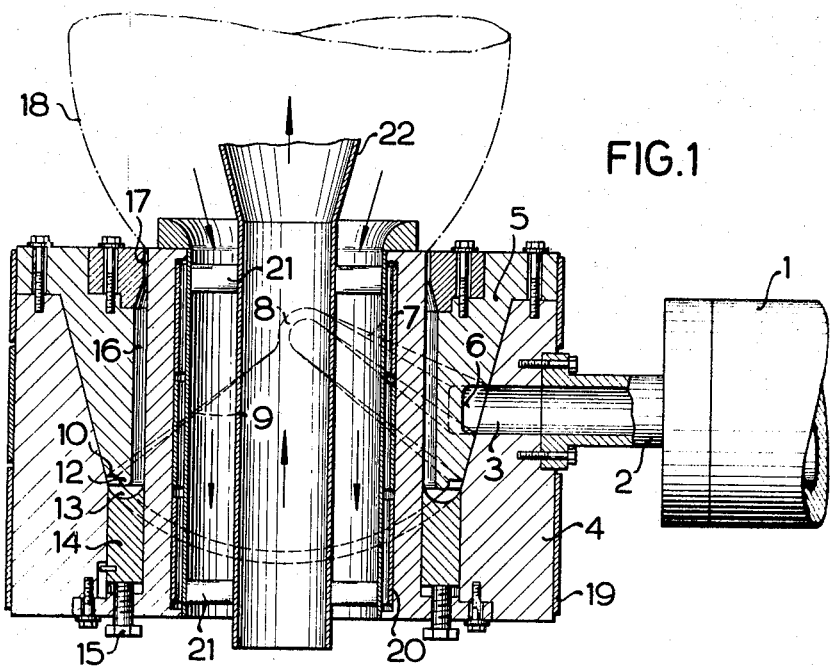

United States Patent
Upmeier

[15] 3,647,339
[45] Mar. 7, 1972

[54] BLOWHEAD FOR MAKING TUBULAR PLASTICS

[72] Inventor: Hartmut Upmeier, Tecklenburg, Germany

[73] Assignee: Windmoller & Holscher, Lengerich of Westphalia, Germany

[22] Filed: Jan. 13, 1970

[21] Appl. No.: 2,517

[30] Foreign Application Priority Data

Jan. 22, 1969 Germany ...................... P 19 03 110.8

[52] U.S. Cl. ............................... 425/326, 425/66, 425/461
[51] Int. Cl. ........................................................ B29d 23/04
[58] Field of Search ..................... 18/13 R, 13 A, 13 T, 14 R, 18/14 G, 14 S, 14 T, 14 V, 12 DM

[56] References Cited

UNITED STATES PATENTS

| | | | |
|---|---|---|---|
| 3,054,143 | 9/1962 | Stenger | 18/14 G |
| 3,193,879 | 7/1965 | Corbett | 18/14 T |
| 3,225,386 | 12/1965 | Newman | 18/14 T |

Primary Examiner—J. Spencer Overholser
Assistant Examiner—Norman E. Lehrer
Attorney—Fleit, Gipple & Jacobson

[57] ABSTRACT

A blowhead for making tubular plastics film comprising a housing having a central aperture for installing special equipment, a lateral supply passage in the housing for the entry of molten plastics material, branch passages which branch from the supply passage and extend, each in its own direction, through 90° about an insert in the housing, are then shortly curved to divert the flow of plastics material axially of the blowhead against the direction in which film is blown, and then diverge constantly in the peripheral direction until they merge at positions at an end of the insert, recesses formed in the housing adjacent the end of the insert to direct the flow of plastics material over projecting surfaces provided on the end of the insert and into an annular passage leading to a nozzle orifice from which the plastics material is blown as a film, the projecting surfaces and recesses extending in the direction opposite to the film blowing direction such that, starting from the sharp curvatures, the flow path for the plastics material to the nozzle orifice has the same length in every angular direction of the diverging portions of the branch passages.

7 Claims, 3 Drawing Figures

PATENTED MAR 7 1972

3,647,339

INVENTOR
Hartmut UPMEIER
By
Fleit, Gipple & Jacobson
his ATTORNEYS

BLOWHEAD FOR MAKING TUBULAR PLASTICS

The invention relates to a blowhead for making tubular plastics film.

Such blowheads generally have a central supply passage for plastics material leading to radially symmetric distributing passages for the even distribution of the plastics material so that the thickness of the resultant blown film will be kept within close tolerances. A disadvantage of this construction is, however, that it is difficult or impossible to provide large apertures right through the blowhead and its supply passage for the purpose of receiving special equipment that extends into the interior of the blown tubular film. More particularly, it is not possible to employ internal air cooling equipment which not only effects cooling by replacing large quantities of hot air within the tubular film but also withdraws vapors so that the film can be laid flat without the danger of the walls of the film sticking to one another and freely fed at high speeds to high capacity other machinery for processing the film, e.g., for welding and severing it to make plastics bags.

To enable special equipment to be received through the blowhead, constructions have been developed in which the supply passage for the molten plastics material enters the blowhead from the side and an annular distributing passage is provided around a large central aperture which extends in the direction of blowing the film. In a first such construction, the lateral supply passage opens into an annular passage leading to a coaxial nozzle orifice through which the film is blown. In a development of this construction, eccentric throttle orifices or adjustable throttle rings are used for compensating the reduction in pressure in the annular passage. In a second construction, the lateral supply passage opens tangentially into a helical distributing passage which gradually opens on its underside into the nozzle orifice so that the helical flow is gradually converted into an axial flow.

All these constructions can be used to work at their best only with a particular viscosity of molten plastics material. If the quantity of molten material, the type of plastics or even only the temperature of the blowhead is changed then the distribution of flow will be different and there may be large variations in the thickness of the blown tubular film.

The invention aims to provide a blowhead having a lateral supply passage and a large central aperture, by which differences in the resulting film thickness are kept to a minimum. The construction of the blowhead should also be such that its axial length should be very short even for large nominal widths, this being desirable in order to achieve short cooling paths for the film so that the factory in which the blowhead is being used need not have an excessively high-ceiling height.

The invention is based on the concept of distributing the molten plastics material in at least two passages which, after having been diverted to extend axially of the longitudinal axis, gradually diverge until the side walls of the passages eventually merge and form edges after which the streams of plastics material are combined again. According to the invention, a blowhead for making tubular plastics film comprises a housing having a central aperture for installing special equipment, a lateral supply passage in the housing for the entry of molten plastics material leading to branch passages which extend, each in its own direction, through 90° about an insert in the housing, are then sharply curved to divert the flow of plastics material axially of the blowhead against the direction in which film is blown thereby and thereafter diverge constantly in the peripheral direction until they merge at positions at an end of said insert, and recesses formed in the housing adjacent said end of the insert to direct the flow of plastics material, in cooperation with projecting surfaces on said end of the insert between the said merging positions, from said merged passages into an annular passage leading to a nozzle orifice from which the plastics material is blown as a film, the said projecting surfaces and recesses extending in a direction opposite to the film blowing direction such that, starting from the said sharp curvature, the flow path for the plastics material to the nozzle orifice has the same length in every angular direction of the diverging portions of the branch passages.

In this way, all parts of the plastics flow will be along equally long paths and will be subjected to identical shear stresses so that variations in the operating conditions or in the nature of the plastics material will not influence the quality of the resulting film.

Preferably, the requirement for equally long flow paths is achieved by making the projecting surfaces in the form of lips and by ensuring that the crest line of each lip as viewed in a developed condition is substantially, i.e., corrected according to the lip thickness, constituted by the geometric locus of the midpoints of all imaginary straight lines drawn in the film blowing direction from a straight line joining the said merging positions to an arc whose center is the imaginary point of intersection of the sides of the diverging portion of the respective branch passage and whose radius is equal to the distance of said point of intersection from the merging positions.

In one form of the invention, the branch passages are formed in a substantially frustoconical portion of the insert, the frustoconical portion converging in the film blowing direction. Each branch passage is constantly reduced in width and increased in depth between the supply passage and the sharp curvature so that at the sharp curvature the depth of the passage is at least double its width. The relatively narrow width of the passage reduces interlayer displacement of the molten material to a minimum while it passes through the sharp curvature. The parts of the branch passages between the supply passage and the sharp curvature are preferably inclined against the film blowing direction at an acute angle thereto, this meeting the requirement for a blowhead having a short axial length.

The part of the housing containing the recesses may be in the form of an axially adjustable ring, this permitting a limited amount of pressure regulation, for example for compensating the pressure differences when using different extruding tools having different widths of nozzle orifices and/or different nozzle diameters.

Figure 2:
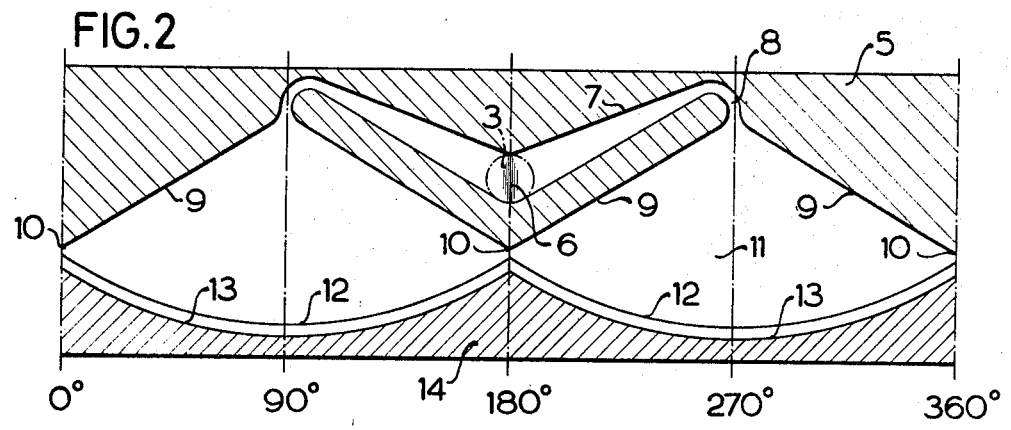
Figure 3:
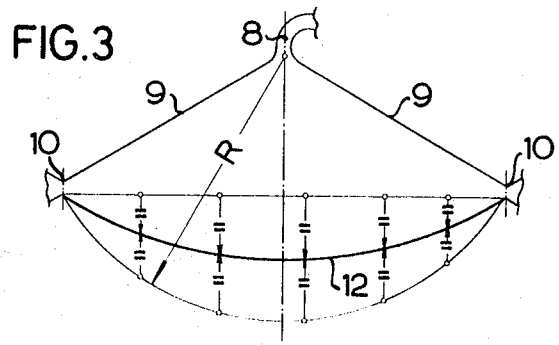

An example of the invention is illustrated in the accompanying drawings wherein:

FIG. 1 is a longitudinal section through a blowhead;

FIG. 2 is a developed view of an insert of the FIG. 1 blowhead having passages formed therein, the developed view being taken closely above the bases of the passages which preferably lie on a cylindrical surface, and FIG. 3 is a diagram illustrating the principle of constructing the curvature of lip-shaped projections on the insert of the FIG. 1 blowhead, the diagram being simplified by neglecting the thicknesses of the lips.

Referring to FIG. 1, an extruder for molten plastics material is diagrammatically indicated at 1. It is coupled by a connector 2 to a lateral supply passage 3 in a housing 4 from which the plastics material is fed into an insert having a frustoconical portion 5. The frustoconical portion diverges in the direction in which a film 18 is blown by the blowhead and it has distributing passages worked into it. The plastics material in the supply passage 3 is separated by an edge 6 to flow into the two distributing passages 7. The width of each passage is at first larger than its depth but then decreases constantly and the depth increases so that the cross section of the passage remains the same. This is achieved by inclining the passages 7 at an acute angle to one another in the film blowing direction towards the larger diameter of the frustoconical portion of the insert 5, whereby the depth of the passages, which have a cylindrical base, is constantly increased. At the position where the two passages 7 reach a plane that is normal to the axis of the supply passage 3 and that contains the axis of the blowhead, the two passages 7 follow a sharp bend 8 having a small radius of curvature. The narrow width of each passage ensures that the interlayer displacement of the molten material in the bend is a minimum. The passages then diverge along a relatively short distance from the bend 8 until the sides 9 of the diverging portions of the passages intersect at edges 10 beyond which the part streams of plastics material are combined again.

The base surfaces 11 of the passages are cylindrical and are extended between the edges 10 to form lip-shaped projections 12 directed opposite to the film blowing direction so that all parts of the plastics flow after the bend 8 follow an equally long path right up to a nozzle orifice 17 from which the film is blown. FIG. 3 illustrates the principle of constructing the curvature of each lip 12, the thickness of the lip being neglected. The crest line 12 of each lip is drawn through the midpoints of lines extending at right angles from a straight line joining the edges 10 to an arc having its center at the intersection of the sides 9 of the passage and having a radius R equal to the length of each side 9.

The lips or projections cooperate with recesses 13 in the housing to form a passage of uniform cross section. The recesses 13 are formed in a portion of the housing that is constituted by an axially displaceable ring 14 which can be adjusted by means of screws 15. Such adjustability permits a limited amount of pressure regulation, for example for compensating pressure differences when using different extrusion tools that have different widths of nozzle orifices and/or different nozzle diameters.

The deflection of the plastics material by means of the recesses 13 so that the plastics material then flows in the film blowing direction avoids the need for further diverting passages that would be necessary if the conical portion of the insert 5 were to diverge in a direction opposite to that illustrated in FIG. 1. The plastics material now flows along an annular passage 16 to the nozzle orifice 17 where the film 18 is formed.

Heating of the blowhead by means of heating elements is diagrammatically indicated at 19 and 20, whilst cooling of the film takes place with the aid of an air-supply tube 22 which is supported within a central aperture of the housing 4 by means that are diagrammatically indicated at 21. The extrusion tools forming the nozzle orifice 17 and their mounting and centering are not illustrated in greater detail because they can be effected in any desired known manner.

The illustrated embodiment represents the best way known to the applicants for implementing the invention. The conical portion of the insert 5 could diverge in the opposite direction to that illustrated but this would make it necessary to provide an additional S-shaped bend before the plastics material reaches the nozzle orifice 17. Also, more than just two distributing passages 7 could be provided to lead into a corresponding larger number of diverging passage portions 9 which will form more than just two of the edges 10; however, this will make the construction more complicated and will also make cleaning more difficult. Further, the portion of the insert 5 having the passages 6 to 12 formed therein may be cylindrical instead of frustoconical but this will considerably restrict the scope of designing the blowhead in view of the different depths of the passages that are required.

I claim:

1. A blowhead for making tubular plastics film, comprising a housing having a central aperture for installing special equipment, a lateral supply passage in the housing for the entry of molten plastics material, branch passages which branch from said supply passage and extend, each in its own direction, through 90° about an insert in the housing, are then sharply curved to divert the flow of plastics material axially of the blowhead against the direction in which film is blown, and then diverge constantly in the peripheral direction until they merge at positions at an end of said insert, recesses formed in the housing adjacent said end of the insert to direct the flow of plastics material over projecting surfaces provided on said end of the insert and into an annular passage leading to a nozzle orifice from which the plastics material is blown as a film, the said projecting surfaces and recesses extending in the direction opposite to the film blowing direction such that, starting from said sharp curvatures, the flow path for the plastics material to the nozzle orifice has the same length in every angular direction of the diverging portions of the branch passages.

2. A blowhead according to claim 1, wherein the branch passages are formed in a substantially frustoconical portion of the insert.

3. A blowhead according to claim 1, wherein there are two said branch passages.

4. A blowhead according to claim 1, wherein the projecting surfaces are formed by lips and wherein the crest line of each lip as viewed in a developed condition is substantially, constituted by the geometric locus of the midpoints of all imaginary straight lines drawn in the film blowing direction from a straight line joining the said merging positions to an arc whose center is the imaginary point of intersection of the sides of the diverging portion of the respective branch passage and whose radius is equal to the distance of said point of intersection from the merging positions.

5. A blowhead according to claim 1, wherein each branch passage is constantly reduced in width and increased in depth between the supply passage and the said sharp curvature so that at the sharp curvature the depth of the passage is at least double its width.

6. A blowhead according to claim 2, wherein the frustoconical portion of the insert diverges in the film blowing direction and the parts of the branch passages between the supply passage and the sharp curvature are inclined against the film blowing direction at an acute angle thereto.

7. A blowhead according to claim 1, wherein the part of the housing containing the said recesses is in the form of an axially adjustable ring.

* * * * *